P. H. GALLAGHER.
COUPLING DEVICE.
APPLICATION FILED OCT. 27, 1915.
1,185,994.
Patented June 6, 1916.
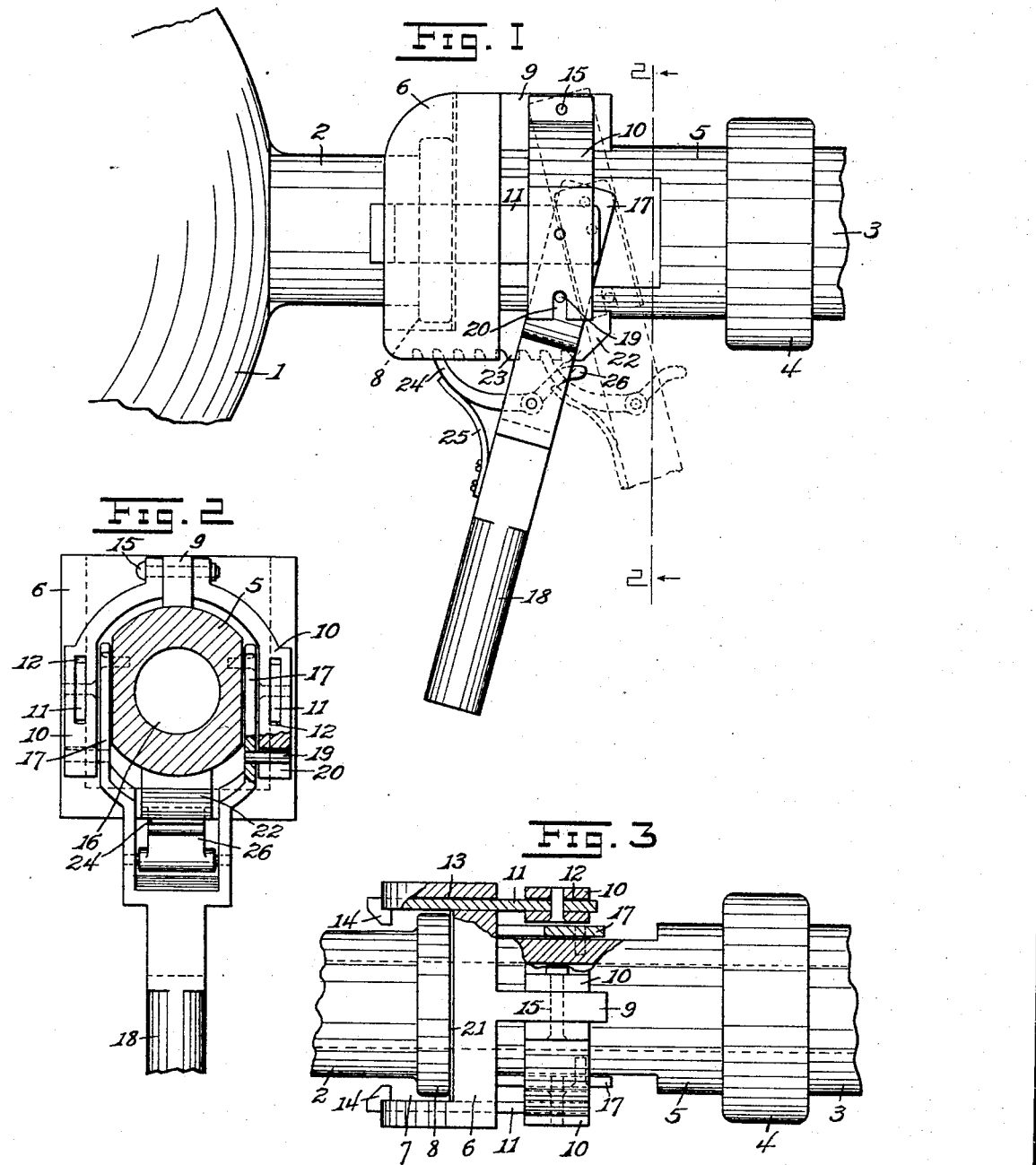
WITNESSES
INVENTOR
ATTORNEYS

UNITED STATES PATENT OFFICE.

PATRICK H. GALLAGHER, OF TORONTO, OHIO.

COUPLING DEVICE.

1,185,994.   Specification of Letters Patent.   Patented June 6, 1916.

Application filed October 27, 1915. Serial No. 58,151.

*To all whom it may concern:*

Be it known that I, PATRICK H. GALLAGHER, a citizen of the United States of America, and resident of Toronto, county of Jefferson, and State of Ohio, have invented certain new and useful Improvements in Coupling Devices, of which the following is a specification.

This invention relates broadly to pipe coupling devices, and more specifically to a coupling designed for use in testing gas meters and the like.

In meter testing rooms it has heretofore been the practice to couple meters to the supply pipe by means of an ordinary threaded coupling or union. This necessarily involves considerable labor and, when large numbers of meters are tested, consumes much time.

It is the primary object of the present invention to provide a simple and efficient coupling device whereby the meter may be connected to and disconnected from the supply pipe almost instantly, or with a minimum expenditure of time and labor.

In describing the invention in detail, reference is herein had to the accompanying drawings, forming a part of this specification, in which—

Figure 1 is a side elevation of the invention applied in initial coupling position; Fig. 2 is a section on line 2—2, Fig. 1; and Fig. 3 is a view, partly in top plan and partly in section, showing the device applied in the position shown in Fig. 1.

Referring to said drawings, in which like designating characters distinguish like parts throughout the several views—1 indicates the body of a gas or other meter having the usual tubular stem 2 through which gas is supplied to or discharged from the meter, and 3 indicates a gas supply pipe. Permanently coupled to said supply pipe 3, as by a union 4, is the rear end of a tubular member 5 constituting a part of my invention. Said tubular member has formed integral therewith at its front end a head portion 6 provided with a channel 7 adapted for receiving therein the flange or collar 8 of the stem 2 of the meter. Extending rearward from the upper portion of the head 6 is a rib 9 to which is pivotally connected the upper ends of a pair of members 10 which together constitute a yoke disposed in straddling relation to the tubular member 5. Pivotally connected to said yoke members 10 at diametrically opposite sides of the tubular member 5 are the rear ends of a pair of horizontally disposed arms 11. Said arms are preferably mounted in slots 12 provided therefor in said yoke members and extend forward through and are longitudinally movable in similar slots 13 provided therefor in the head 6. Hooks 14 are formed on the front ends of said arms, the same being designed, when the yoke members are swung rearward on their pivot 15, to engage the flange or collar 8 of the meter stem 2 and to draw the latter into close fitting relation to the head 6 with the end of its bore in direct communication with the bore 16 in the tubular member 5.

Pivotally connected to opposite sides of the member 5 between the latter and the yoke members 10 are the ends of arms 17 formed by the bifurcated end of a lever 18. Each of said arms 17 carries at an appropriate point an outwardly or laterally extending stud or pin 19 which is received within an open slot 20 provided in the lower end of the adjacent yoke member 10. Due to the construction and arrangement of parts described, rearward movement of the lever 18 will effect a corresponding movement of the yoke members 10, the pins 19 moving in the slots 20 of the latter, and the arms 11 are thereby drawn rearwardly for binding the meter stem 2 in close relation to the tubular member 5. A gasket 21 of suitable material is preferably disposed in encircling relation to the front end of the bore 16 for preventing leakage at the joint.

Formed in the under side of the head 6 and on a rearward extension 22 of the latter is a series of teeth 23 designed to be engaged by the point of a dog 24 which is pivotally mounted between the lever arms 17, whereby said lever is maintained in adjusted position. Said dog is normally maintained in engagement with said teeth by a suitable spring, as 25, carried by the lever. A rearwardly directed finger piece 26 formed on said dog affords means whereby said dog may be lifted against the tension of said spring to permit forward movement of the lever, as when it is desired to release the hold on the meter stem 2.

What is claimed is—

1. A temporary coupling device for meters, comprising a tubular member adapted for connecting to a supply pipe, a head formed on the front end of said member, a yoke pivotally mounted rearward of said head and having its members disposed in straddling relation to said tubular member, each of said yoke members having a slot in its lower end, a pair of arms pivotally connected to said yoke members intermediate the ends of the latter and longitudinally movable through said head, said arms having hooks adapted for clamping engagement with a meter stem, and a lever pivoted to said tubular member, said lever having studs received in the slots of said yoke members.

2. A temporary coupling device for meters, comprising a tubular member adapted for connecting to a supply pipe, a head formed on the front end of said member, a yoke pivotally mounted rearward of said head and having its members disposed in straddling relation to said tubular member, each of said yoke members having a slot in its lower end, a pair of arms pivotally connected to said yoke members intermediate the ends of the latter and longitudinally movable through said head, said arms having hooks for assuming clamping engagement with a meter stem, a lever pivoted to said tubular member, said lever having studs received in the slots of said yoke members, and means for holding said lever in adjusted position.

3. A temporary coupling device for meters, comprising a tubular member adapted for connecting to a supply pipe, a head formed on the front end of said member, said head having a channel in its front end for receiving a meter stem, a yoke pivoted to and disposed in straddling relation to said tubular member, arms longitudinally movable through said head and carrying hooks on their front ends for assuming clamping engagement with a meter stem, said arms being pivotally connected to the members of said yoke, a lever pivoted to said tubular member and operatively connected to said yoke members whereby movement of said lever produces a swinging movement of said members, and means for holding said lever in adjusted position.

4. A temporary coupling device for meters, comprising a tubular member adapted for connecting to a supply pipe, a head formed on the front end of said member, said head having a channel in its front end for receiving a meter stem, a yoke pivoted to and disposed in straddling relation to said tubular member, arms longitudinally movable through said head and carrying hooks on their front ends for assuming clamping engagement with a meter stem, said arms being pivotally connected to the members of said yoke, a lever pivoted to said tubular member and operatively connected to said yoke members whereby movement of said lever produces a swinging movement of said members, teeth formed on the under side of said head and said tubular member, and a spring-pressed dog carried by said lever and normally engaging said teeth whereby the lever is held in adjusted position.

5. A temporary coupling device for meters, comprising a tubular member adapted for connecting to a supply pipe, a lever pivotally connected to said member, oppositely disposed arms having hooks on their front ends for engaging a meter stem, said arms being longitudinally movable with movement of said lever, teeth formed on said tubular member, and a dog carried by said lever and normally engaging said teeth whereby the lever is held in adjusted position.

6. A temporary coupling device for meters, comprising a tubular member adapted for connecting to a supply pipe, a head formed on the front end of said member, a lever pivotally connected to said member, oppositely disposed arms having hooks on their front ends for engaging a meter stem, said arms being longitudinally movable through said head with movement of said lever, teeth formed on the under side of said head, and a spring-pressed dog carried by said lever and normally engaging said teeth whereby the lever is held in adjusted position.

In testimony whereof, I affix my signature in presence of two subscribing witnesses.

PATRICK H. GALLAGHER.

Witnesses:
  LOUIS MATHIEN,
  JOHN SANIR.